United States Patent [19]

Takagi

[11] 4,248,400
[45] Feb. 3, 1981

[54] OIL DAMPER FITTING APPARATUS

[76] Inventor: Tatsuya Takagi, 6-10, Araebisumachi, Nishinomiya-shi, Hyogo-ken, Japan

[21] Appl. No.: 7,846

[22] Filed: Jan. 30, 1979

[51] Int. Cl.³ .............................................. F16M 5/00
[52] U.S. Cl. ..................................... 248/635; 403/239
[58] Field of Search ............... 403/239, 238, 196, 197; 248/632, 635

[56] References Cited

U.S. PATENT DOCUMENTS

| 2,399,414 | 4/1946 | Wells et al. | 248/635 |
|---|---|---|---|
| 2,520,757 | 8/1950 | Cain | 248/635 |
| 2,685,178 | 8/1954 | Eck | 248/635 |
| 2,862,737 | 12/1958 | Pearson | 403/239 |
| 3,084,963 | 4/1963 | Beehler | 403/238 |
| 3,845,923 | 11/1974 | Atkinson | 248/635 |

Primary Examiner—Robert I. Smith
Attorney, Agent, or Firm—Birch, Stewart, Kolasch & Birch

[57] ABSTRACT

The present invention is directed to an oil damper fitting apparatus mounted in a car with the intervention of upper and lower rubber bushings receiving a load primarily produced by shearing stress and secondarily produced by the compressive stress. The upper and lower bushings are respectively disposed on the extensive and compressive sides of the oil damper. Each bushing is defined between a washer and a seat, the washer having an inner diameter slightly larger than the outer diameter of the seat. The upper rubber bushing has a greater elastic constant than the lower rubber bushing and is initially contracted to half the stroke of shearing deflection, the lower rubber bushing being initially compressed to the full stroke of shearing deflection.

11 Claims, 5 Drawing Figures

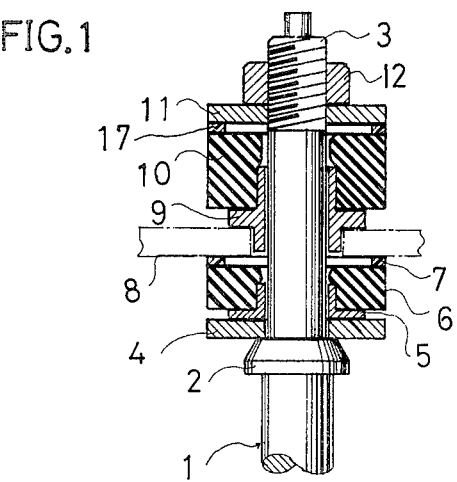
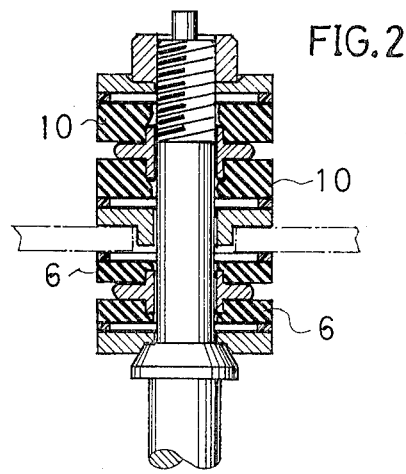
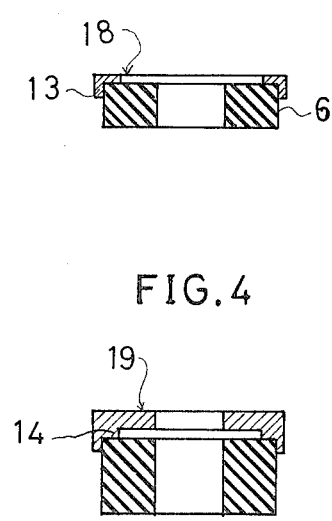
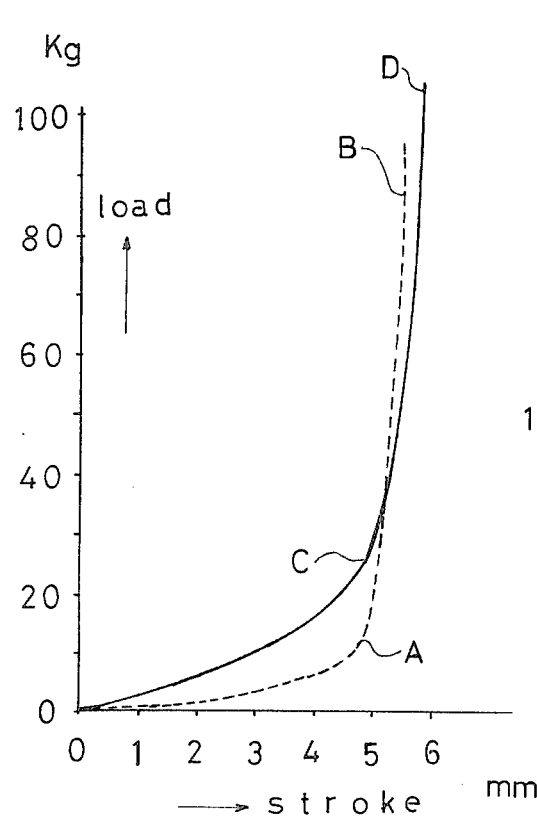

OIL DAMPER FITTING APPARATUS

BACKGROUND AND SUMMARY OF THE INVENTION:

This invention relates to an apparatus for fitting an oil damper in a car, and particularly to an oil damper fitting apparatus provided with rubber bushings as buffers which contribute to make an automobile more comfortable to ride in.

Oil dampers are usually mounted between the frame and the axle of a car with the intervention of rubber bushings, which relieves shocks of generated breaking forces and serves as a free joint. There are two types of prior art rubber bushings, one being of compression-type to receive a load by compressive stress and the other being of shearing type to resist a load by shearing stress. The compression type rubber bushing is resistible to a large load but has disadvantages in that the stroke of deformation is relatively small for adequate buffer action. Further, the ability to interrupt the transmission of vibrations is insufficient. On the other hand, the shearing type rubber bushing has a good ability to interrupt vibrations and a relatively long stroke of deflection for buffer action. However, the shearing type rubber bushing has a defect in that the tolerable stress is too small to be utilized in such a space as voluminously restricted.

Passenger cars are usually provided between the frame and the axle with double acting oil dampers for the purpose of maintaining a rolling rigidity or a force resistible to inclination due to a centrifugal force generated during turning a side wind or the like. The damper has the respective damping forces in both the extensive and contractile directions of the piston rod. The breaking force in the extensive side is directed primarily to dampen vibrations above the spring and secondarily to suppress vibrations under the spring and hold the rolling rigidity. The breaking force in the compressive side is assigned for restraining the wheel from hopping up, breaking vibration under the spring and maintaining the rolling rigidity. Accordingly, the breaking force in the extensive side is remarkably greater than that in the contractile side, for example, the force in the extensive side being three or four times as large as the other in the case of 0.3 m/s piston speed. This suggests that an effective buffer should be mounted in the extensive side of the oil damper. When a soft rubber bushing is mounted in the compressive side of the oil damper, no breaking force will generate to dampen vibrations of small amplitudes, permitting vibrations in the tires. When the soft rubber bushings are provided on both sides of the oil damper, the car will have a poor rolling rigidity.

It is the primary object of this invention to provide an oil damper fitting apparatus free from the disadvantages as described above.

The apparatus according to this invention includes rubber bushings wherein a load is received initially by the shearing stress in the bushing compressed to the full stroke of deformation and by the compressive stress subsequently produced in the same. The rubber bushing in the extensive side is always stronger than that in the compressive side and initially contracted to half the stroke of shearing deformation when fitted. The rubber bushing in the contractile side is initially compressed to the substantially full stroke of shearing deflection to hold the rolling rigidity of a car.

In preferred embodiments, the rubber bushing is restrained from protruding in the both the outward and inward radial directions. Without being restrained from the outward protrusion, the rubber bushing under a heavy load would project outwardly to reduce the resisting force and make a wearing contact with the seat. Unless prevented from the inward deflection, it would have the inner periphery tightly contacted with the bolt portion of the oil damper and frictionally worn through their relative slide movement.

Other features, additional objects, and many of the attendant advantages of this invention will readily be appreciated as the same becomes better understood by reference to the following detailed description of preferred embodiments when considered in connection with the appending drawings.

BRIEF DESCRIPTION OF THE DRAWINGS:

FIG. 1 is an axial, sectional view of an apparatus of the invention showing the state prior to being fastened;

FIG. 2 is a sectional view, similar to FIG. 1, of another embodiment provided with double rubber bushings, showing the state prior to being fastened;

FIG. 3 is an axial, sectional view of another type of the washer as shown in FIG. 1;

FIG. 4 is an axial, sectional view of another type of the seat as shown in FIG. 1; and FIG. 5 is a characteristic diagram of the rubber bushing as shown in FIG. 2.

DETAILED DESCRIPTION OF PREFERRED EMBODIMENTS:

Referring to FIG. 1, an oil damper is illustrated which includes a piston rod 1 formed with a shoulder 2 and a bolt 3 extending upwardly from the shoulder. The following elements are positioned adjacent to the shoulder 2, starting from the lower portion of FIG. 1, a lowermost seat 4, a lower flange 5, a lower rubber bushing 6, a lower washer 7, an upper flange 9 with the bottom inserted in a bore 8 in a frame member of a car, an upper rubber bushing 10, an upper washer 17, an upper seat 11, and an uppermost nut 12 for tightening all the members.

Each of the flanges 5, 9 are made of oilness bearing material such as a high molecular weight polyethylene resin which includes a centrally formed boss portion fitted in an axial hole of the respective rubber bushings 6, 10 for restricting their radial instrusion. The boss portion of each flange has an outer diameter larger than the inner diameter of the rubber bushing and the length shorter than that of the rubber bushing. The rubber bushings 6, 10 are not special but are the same as widely used compression type bushings. The flanges 5, 9 are pressed in the hole of the rubber bushings 6, 10 to deform the same in the shape of a dish with the result that the rubber bushings according to the present invention increases the effective stroke of deformation.

The adhesive washers 7, 17, made of synthetic resin such as nylon, are adhered to the surface of the respective bushings 6, 10, on which adhesive agents are previously coated. The washers 7, 17 integrally form the annular portion of the respective rubber bushings 6, 10 to restrain the outer-diametrical deformation of the rubber bushing.

The rubber bushing is previously formed in the shape of a concaved dish, if required to have a larger stroke of deformation.

Referring to FIG. 3, there is illustrated another washer 18, which is not adhered to but resiliently fitted on the rubber bushing 6. The washer 18 has the side rim 13 for tightly engaging the side periphery of the rubber bushing 6, so that, once coupled with each other, the rubber bushing 6 has a radial compression produced to hold the washer 18 resiliently without adhesive agents.

Referring to FIG. 4, there is seen another seat 19 formed with an annular projection 14 in place of an adhesive washer.

The washers 7, 17, 18, as shown in the previous embodiments of FIGS. 1, 3 and 4, have an inner diameter a little larger than the outer diameter of the flanges 5, 9, in order to prevent the respective rubber bushings 6, 10 between them from being cut by their shearing action.

One of the rubber bushings 6, 10 on the extensive side of the oil damper has a stronger and larger elastic constant in the stroke of shearing deformation than the other in the contractile side. The nut 12 on the bolt 3 of the piston rod 1 is fastened to an extent that the other bushing in the contractile side is compressed to the end of the stroke of shearing deflection and the one bushing in the extensive side is compressed to half the stroke of shearing deflection. One reason for this is that the contractile side bushing still remains contractible to inhibit the production of an otherwise noisy play when the extensive side bushing is fully compressed. Another reason is that, when the damper transfers to a compressive position from an extensive position, the bushings are within a range of elastic deformation below the critical shearing stress to bring buffer effects, the extensive side bushing being contracted and the other extended.

Referring to FIG. 2, there is seen another embodiment, in which the upper and lower bushings 6, 10 are duplicate to have a larger stroke of deflection than in the embodiment of FIG. 1. The load-deflection diagram of the embodiment as shown in FIG. 2 is characteristically shown in FIG. 5, in which the embodiment has the following dimension: the upper bushing diagramatically illustrated by a solid line has an outer diameter of 34 mm, a thickness of 7 mm and 60° rubber hardness; the lower bushing illustrated by a dotted line has an outer diameter of 34 mm, a thickness of 3.3 mm, and 60° rubber hardness; and the adhesive washer has a thickness of 1.4 mm. Curves OA and OC in FIG. 5 indicate the stroke of deformation by shearing stress and curves CD and AB indicate the stroke by compressive stress. When both bushings are contracted in the shape of a dish, the value of the elastic constant of the rubber bushing will be estimated from the diagram. The upper rubber bushing 6 in the extensive side of the oil damper is required to have an initial fitting compression similar to or larger than a predetermined value, in order to hold a rolling rigidity and shut out vibrations produced above the spring as well as vibrations of small amplitudes of tires. The value is desirable to be 10 to 15 Kg for the passenger car of about 1,300 Kg weight. The diagram of FIG. 5 shows that an initial compression of 10 Kg causes the bushing in the extensive side to deflect to the extent of about half the stroke of shearing deflection and the bushing in the contractile side to the full stroke of shearing deflection. It will also be understood from the diagram of FIG. 5 that the rubber bushing in the contractile side still has an effective stroke of about 2 mm remaining when the extensive side bushing is compressed from the initial compression to the extremity by the stroke of about 3 mm.

As stated above, the apparatus of the invention is easily applicable to existing automobiles because it does not require any special or expensive elements but merely requires the same rubber bushing as widely used. The present invention makes a car equipped with apparatus more comfortable to ride in. Furthermore, the apparatus is advantageously mounted on the bolt of the oil damper.

It should be understood that the foregoing disclosure relates only to preferred embodiments of the invention, and that it is intended to cover all changes and modifications of the embodiment of the invention chosen herein for the purpose of the disclosure which do not constitute departures from the spirit and scope of the appended claims.

What is claimed is:

1. A support mounting for a rod subjected to limited reciprocation comprising:
    a support frame including an opening in which said rod is inserted;
    a shoulder portion formed on said support rod;
    a lowermost seat adapted to mate with said shoulder portion;
    at least one lower bushing operatively disposed between said lowermost seat and said opening in said support frame;
    an upper flange mounted as a sleeve within said opening in said support frame, said upper flange being in slideable engagement with said rod;
    at least one upper bushing operatively disposed between said upper flange and an upper seat secured to said rod by a fastening means; and
    said upper bushing having an elastic constant larger than said lower bushing and said fastening means being initially fastened to contract said upper bushing by the middle stroke of shearing deflection and the lower bushing being contracted by approximately the full stroke of shearing deflection.

2. A supporting mounting according to claim 1, wherein the upper seat includes a washer of material harder than the upper bushing, said washer being flatly shaped and annularly, marginally adhered to the surface of the upper bushing to restrain the outward radial deformation of the upper bushing.

3. A support mounting according to claim 1, wherein the upper seat includes a washer of material harder than the upper bushing, said washer being formed with a peripheral rim for resilient engagement with the side periphery of the upper bushing and for restraining the outward radial deformation of the upper bushing.

4. A support mounting according to claim 1, wherein the lower seat includes a flange member having the boss portion thereof fitted in the lower bushing to restrain the inward radial deformation of the lower bushing.

5. A support mounting according to claim 1, wherein the upper and lower bushings have the shape of a concaved dish, whereby the upper and lower bushings have an increased, effective stroke of deflection.

6. A support mounting according to claim 1, wherein said at least one lower bushing comprising two bushings separated by a first flange member.

7. A support mounting according to claim 1 or 6, wherein said at least one upper bushing comprising two bushings separated by a second flange member.

8. A support mounting according to claim 1, wherein said upper and lower bushings are rubber.

9. A support mounting according to claim 1, wherein said lower bushing includes a washer of material harder than the lower bushing, said washer being flatly shaped and annularly, marginally adhered to the surface of the lower bushing between said lower bushing and said support frame to restrain the outward radial deformation of the lower bushing.

10. A support mounting according to claim 1, wherein said lower bushing includes a washer of material harder than the lower bushing, said washer being formed with a peripheral rim for resilient engagement with the side periphery of the lower bushing and for restraining the outward radial deformation of the lower bushing.

11. A support mounting according to claim 1, wherein said upper flange includes a boss portion fitted in the upper bushing to restrain the inward radial deformation of the upper bushing.

* * * * *